US006402499B1

(12) United States Patent
Braungardt et al.

(10) Patent No.: US 6,402,499 B1
(45) Date of Patent: Jun. 11, 2002

(54) VIBRATION DRIVE

(75) Inventors: Rudolf Braungardt, Lengenfeld; Erwin Schmucker, Schelklingen, both of (DE)

(73) Assignee: Kobra Formen- und Anlagenbau GmbH, Lengenfeld (DE)

( * ) Notice: Subject to any disclaimer, the term of this patent is extended or adjusted under 35 U.S.C. 154(b) by 0 days.

(21) Appl. No.: 09/644,651

(22) Filed: Aug. 24, 2000

(30) Foreign Application Priority Data

Aug. 24, 1999 (DE) ........................................ 199 40 119

(51) Int. Cl.[7] .............................. B28B 1/08; H02N 2/00

(52) U.S. Cl. .................. 425/432; 310/323.18; 310/328; 425/456

(58) Field of Search ................................ 425/432, 456; 310/323.18, 328

(56) References Cited

U.S. PATENT DOCUMENTS 5,191,688 A * 3/1993 Takizawa et al. ........... 310/323

* cited by examiner

*Primary Examiner*—James P. Mackey
(74) *Attorney, Agent, or Firm*—Edmund M. Jaskiewicz

(57) ABSTRACT

A vibration drive particularly suited for a mold for producing concrete molded bodies comprises of at least one piezoelectric vibration exciter which is fixedly attached onto the mold. The vibration exciter comprises a housing in which an unbalance mass is movably supported and is drivingly connected to a piezoelement which is also located in the housing to produce vibration. When an AC voltage is applied to the vibration exciter a deformation movement occurs which is converted into an oscillating motion of the unbalance mass and which thus produces vibrations of the mold.

9 Claims, 3 Drawing Sheets

VIBRATION DRIVE

BACKGROUND OF THE INVENTION

The present invention relates to a vibration drive utilizing a Piezoelectric vibration exciter, more particularly, to such a vibration drive which is mounted on a machine for producing shaped concrete bodies from a mold which is placed on a vibrating table and filled with flowable concrete.

Various forms of mechanical-electrical cam and eccentric motors have been used in order to cause the vibrating table of a molding machine to vibrate. In this manner, the mold which is generally open at the top and bottom and which is positioned on the vibrating table is similarly caused to vibrate to compact and to distribute as uniformly as possible the concrete mass which has been placed in the mold cavities.

The disadvantage of such vibration devices is that the mechanical eccentric motors produce largely uncontrolled vibratory movements which tend to damage and thus cause premature wear on the mold. For this reason, the mold and the vibrating table must be built so as to be very stable and strong and these structures are thus more complex. Moreover, the noise burden from such mechanical vibrating drives is very high and uncomfortable.

Applicant's copending patent application Ser. No. 09/564,035 filed May 4, 2000 discloses positioning Piezoelectric vibration exciters between the vibrating table and the frame of the mold machine. These exciters have a vibrating frequency and other parameters of the vibration drive which can be electronically controlled according to specific requirements of the particular molding operation. The stationary portion of the vibration exciter is connected to the machine frame and the vibrating portion of the exciter is connected to the vibrating table. Such a structure requires complete re-engineering of the mold machine. Existing mold machines therefore cannot be easily refitted with such piezoelectric vibration exciters.

SUMMARY OF THE INVENTION

It is therefore the principal object of the present invention to provide a novel and improved vibration drive utilizing piezoelectric vibration exciters.

It is another object of the present invention to provide such a vibration drive which can be mounted on a vibrating table or mold in a mold machine for producing shaped concrete bodies.

It is a further object of the present invention to provide such a vibration drive which is simplified in structure and which can be mounted directly on the structure which is to be vibrated.

The objects of the present invention are achieved and the disadvantages of the prior art as described above are overcome by the vibration drive of the present invention which has a piezoelement drivingly connected to an unbalance mass which is supported to vibrate freely in the housing of the exciter. The housing is fixedly mounted directly on the mold, the vibrating table or some other structure which is to be caused to vibrate. By applying an AC voltage to the piezoelement it is caused to execute an oscillating movement which is transmitted to the unbalance mass and thus also causes the mold to vibrate.

According to one embodiment of the present invention, the unbalance mass is a piston which is freely mounted of reciprocating movement in a cylindrical space in the housing of the vibration exciter. For damping of the end positions of the moveable piston, at least on the side of the piston opposite the piezoelement there is provided a return valve in the cylinder. The valve opens in the pulling direction of the spring system of the piezoelement and closes in the compression direction in the end position of the piston. Preferably, the return valve is mounted in a cover which closes the cylindrical space within the housing.

In order to produce a vibration movement which is particularly suitable for the different operating positions, at least one vibration exciter with a vertical and/or horizontal direction of vibration is interchangably mounted on one or more sides of the mold. As a modification, the vibration exciter can also be constructed to be an integral portion of the mold itself.

The advantages and results achieved with the present vibration drive is that the vibration exciter can be constructed so as to be relatively small and compact in dimensions and can be attached to various locations in any number on the mold or vibrating table in order to produce different vibrating conditions as may be desired. The vibration exciter can be mounted in such a manner that the vibrating movement of the mold can occur in the vertical or horizontal vibrating directions or there can be a combination of vertical and horizontal vibrations. Mounting the piezoelectric vibration drive directly on the mold significantly reduces the energy consumption since it is only required to vibrate the mold and not other structural members of the machine. Accordingly, the vibration behavior of the mold can be precisely controlled and the noise burden considerably reduced. Since a special vibrating table is not required, the space below the mold can be kept free or may be utilized to insert mold cores or recess bodies from underneath into the mold cavities.

Another major advantage is that in existing mold machines having a vibrating table, the mechanical eccentric motors can be readily and easily replaced by the piezoelectric vibration exciters.

BRIEF DESCRIPTION OF THE SEVERAL VIEWS OF THE DRAWING

Other objects and advantages of the present invention will be apparent upon reference to the accompanying description when taken in conjunction with the following drawings, which are exemplary, wherein.

DETAILED DESCRIPTION OF THE INVENTION

Proceeding next to the drawings wherein like reference symbols indicate the same parts throughout the various views a specific embodiment and modifications of the present invention will be described in detail.

Figure 1:
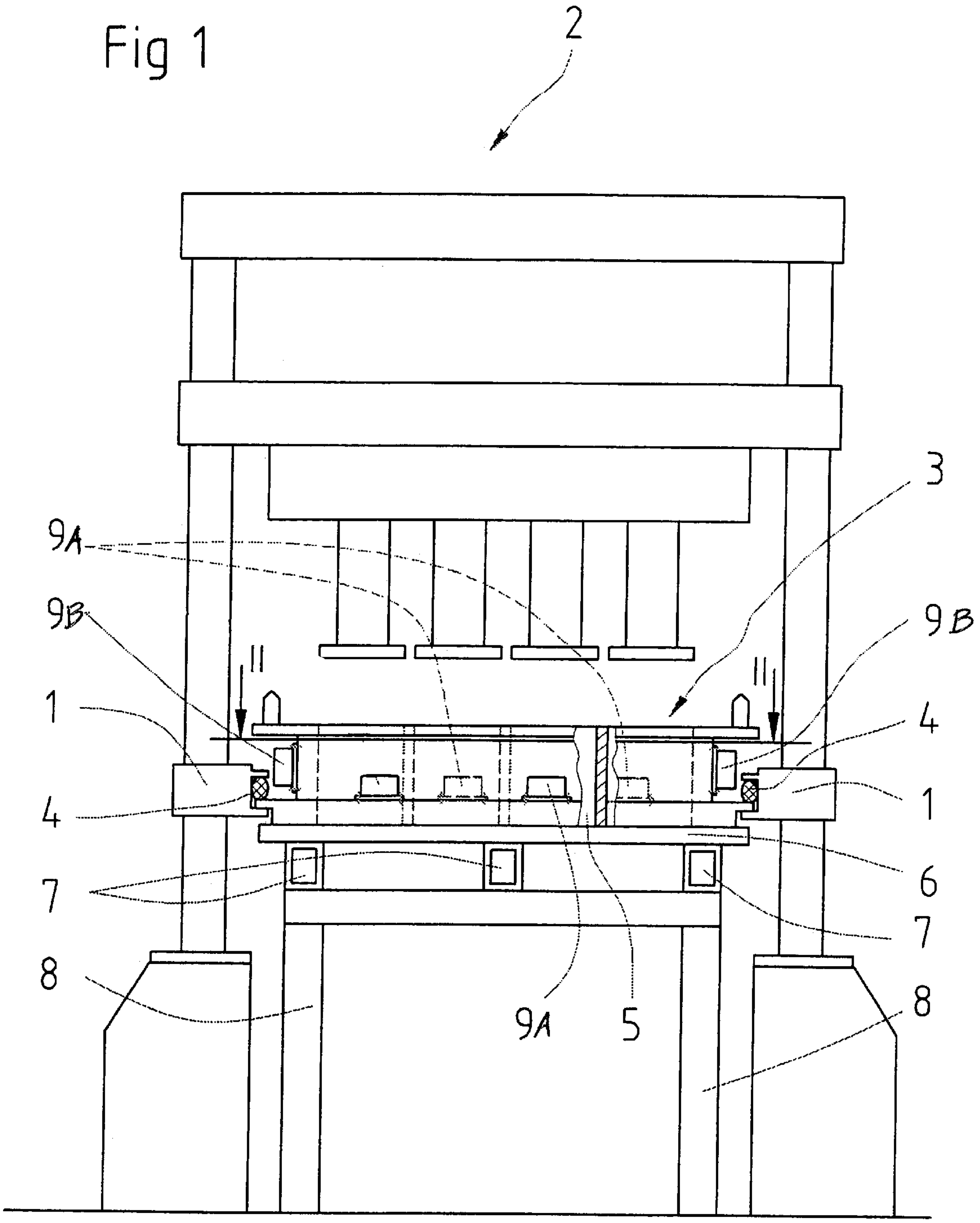
FIG. 1 is a front elevational view of a molding machine with vibration exciters attached to the mold and to the vibrating table.

As may be seen in FIG. 1, there is a molding machine indicated generally at 2 for producing concrete mold bodies and having slidably mounted side brackets 1 to which is attached a mold 3 mounted in resilient rubber supports 4 in the side brackets 1. The brackets 1 are driven to move vertically on guide columns of the molding machine and the mold 3 which has mold cavities 5 therein which are open on the top and bottom can be lowered onto a molding board 6. A molding board 6 is supported on horizontally extending rails 7 of a frame 8 of the molding machine. Mold cavities 5 are filled in the conventional manner with flowable concrete which is uniformly distributed in the mold cavities and compacted by vibrating the mold.

In order to produce the desired vibrations of the heat mold, one or more piezoelectric vibration exciters 9 are fixedly mounted on the outer side walls of the mold 3 in such a manner that when an AC voltage is applied to the vibration exciters 9 the mold will be vibrated.

Figure 3:
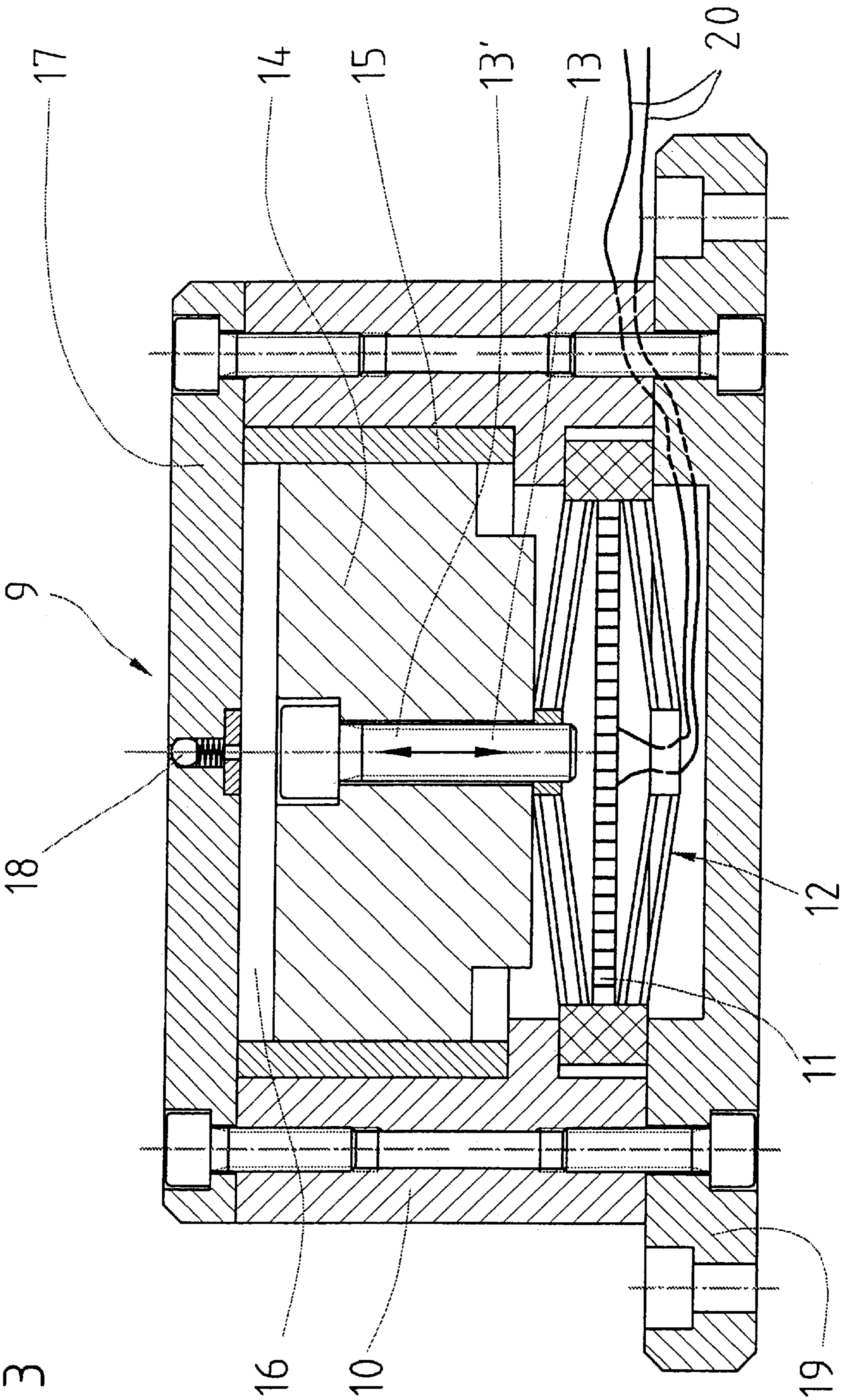
FIG. 3 is a longitudinal cross sectional view through vibration exciter in an enlarged scale.

Each vibration exciter 9 comprises a housing 10 in which a commercially available piezoelement 11 is supported in a known manner so as to be capable of vibrating as shown in FIG. 3. The piezoelement 11 comprises several individual elements which are linearly arranged in a row in the shape of a flat rod both ends of which are supported on the inner wall of the housing 10 in such a manner that the piezoelement 11 is movable within the housing. When an AC voltage is applied to the piezoelement 11, this piezoelement 11 will produce a deforming motion which is amplified through a spring system 12 and converted into a reciprocating motion in the directions of the arrows 13 and 13' and this motion is transversely to the longitudinal direction of the piezoelement 11. The oscillating movement of the spring system 12 is transmitted to a piston 14 which functions as an unbalance mass and which is moveably supported in a cylindrical space 15 within the housing 10 so as to be capable of movement in the directions of the arrows 13 and 13'. Piezoelements constructed in this manner are known and are available on the commercial market as installation parts.

At the end of the piston 14, opposite the piezoelement 11 an air-filled space 16 is formed by a cover 17 which is attached to a face of the housing 10 by bolts or other suitable fastening elements. In the cover 17, there is a return or check valve 18 which opens in the pulling direction 13 of the spring system 12 and closes in the compression direction 13'. As a modification, a second return or check valve can be provided in the housing on the opposite end of the piston. As a result, the movements of the piston are damped at the end positions of the piston.

On the side of the housing 10 opposite the cover 17 there is a flange 19 with suitable openings therein for attachment to a mold 3 by bolts or the like. The piezoelement 11 is connected to a source of electrical current which is not shown through electrical lines 20.

Figure 2:
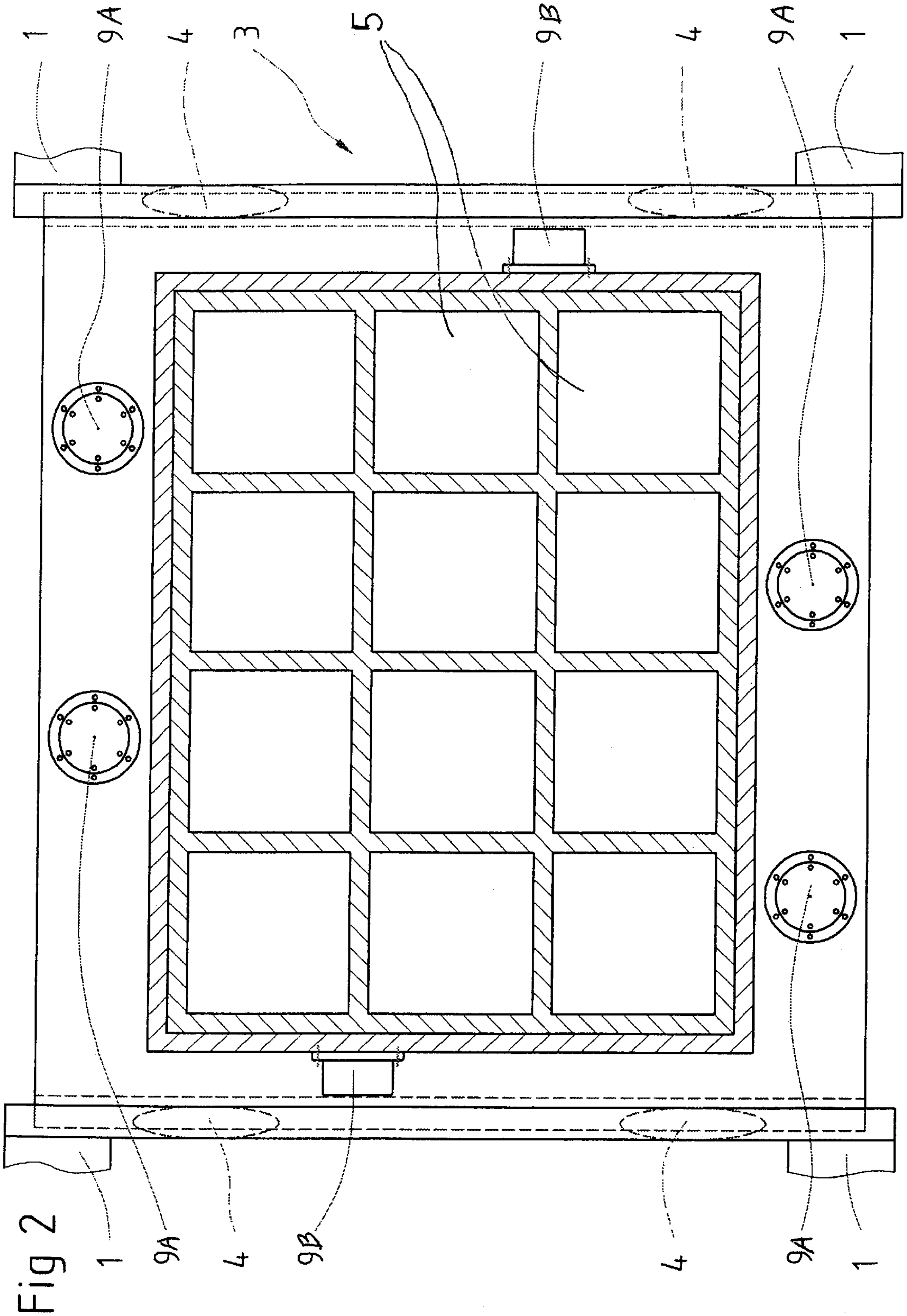
FIG. 2 is a sectional view taken along the line II—II in FIG. 1.

As the embodiment in FIG. 2 illustrates, two vibration exciters 9A are fixedly attached such as by bolts or the like along the longitudinal sides of the flange of the mold 3 such that the mold 3 is vibrated vertically. It is also shown that on two bases of the mold 3 vibration exciters B are attached rotated by 90° so that the mold 3 is moved in the horizontal direction of vibration. In such a manner, a combined specific vibration movement of the mold can occur which, depending on the number and location of the vibration exciters 9, can be varied for a wide variety of combination possibilities according to the requirements of the particular molding operation. A further modification is that the different parameters of the vibration drives, such as the vibration frequency, can be varied by electronic controls as disclosed in applicant's co-pending application referred to above.

In those molding machines having a vibrating table upon which the mold 3 is positioned, the vibration exciters can also be attached to the vibrating table. In this manner, it is possible to refit existing molding machines without major structural changes by replacing the mechanical eccentric motors which are generally attached to the vibrating table by the vibration exciters 9 as disclosed herein.

The use of vibration exciters is not limited to the production of concrete molded bodies but can be utilized whenever a structure or portion of a structure is desired to be vibrated such as, for example, in conveyors.

Thus it can be seen that the present invention has disclosed a vibration drive particularly adapted for mold machines wherein the vibration exciter is attached directly to the component which is to be vibrated. In most cases, the exciter can be attached directly to longitudinal or transverse faces of the mold itself. The mold itself can also be constructed to incorporate the vibration exciters therein so that the exciter is an integral component of the mold.

The vibration exciters of the present invention can be made relatively small and compact in dimension. Thus, a varying number of vibration exciters can be attached to different portions of the mold to produce a horizontal and/or vertical direction of vibration and the vibration drive and thus the vibration behavior of the mold can be adapted to a wide variety of different operating positions.

It will be understood that this invention is susceptible to modification in order to adapt it to different usages and conditions; and, accordingly, it is desired to comprehend such modifications within this invention as may fall within the scope of appended claims.

What is claimed is:

1. A vibration drive for producing vibration on a structure comprising a housing attached to a structure to be vibrated and a Piezoelement therein, means for defining an unbalance mass freely mounted in said housing for reciprocating movement therein, and means within said housing drivingly connecting said Piezoelement to said unbalance means.

2. A vibration drive as claimed in claim 1 wherein said unbalance mass means comprises a piston, said housing comprising a cylinder having a cylindrical space therein and said piston freely reciprocatingly movable in said cylinder.

3. A vibration drive as claimed in claim 2 wherein said means connecting said Piezoelement and said piston comprise a spring system.

4. A vibration drive as claimed in claim 2 wherein said piston has a first end directed toward said Piezoelement and a second end opposite therefrom, a return valve in said cylinder at said second end of said piston, said return valve opens when said piston moves away therefrom and closed when said piston moves toward the valve.

5. A vibration drive as claimed in claim 4 and further comprising a cover attached to said housing to close said cylindrical space, said return valve mounted in said cover.

6. A vibration drive for a machine for producing shaped concrete bodies from a mold having a surface supporting the mold and comprising at least one Piezoelectric vibration exciter having a housing fixedly mounted to said surface and a Piezoelement within said housing, an unbalance mass freely mounted in said housing for reciprocating movement therein, and means within said housing for drivingly connecting said Piezoelement to said unbalance mass so as to cause said surface to vibrate upon actuation of the Piezoelement.

7. A vibration drive for a machine as claimed in claim 6 wherein at least one vibration exciter is mounted on one or more sides of said mold so as to produce horizontal vibrations therein.

8. A vibration drive for a machine as claimed in claim 6 wherein at least one vibration exciter is so mounted on one or more sides of said mold to produce vertical vibrations therein.

9. A vibration drive for a machine as claimed in claim 6 wherein at least one vibration exciter is integrated into the mold.

* * * * *